United States Patent [19]

Donaghey

[11] Patent Number: 4,944,140
[45] Date of Patent: Jul. 31, 1990

[54] GUIDANCE SYSTEM FOR A SELF-PROPELLED MACHINE

[76] Inventor: Richard L. Donaghey, The Paddocks, Gadlys Road, Llanmaes, Nr. Llantwit Major, South Glamorgan, United Kingdom

[21] Appl. No.: 172,329

[22] Filed: Mar. 23, 1988

Related U.S. Application Data

[63] Continuation of Ser. No. 832,086, Feb. 24, 1986, abandoned.

[30] Foreign Application Priority Data

Feb. 26, 1985 [GB] United Kingdom ............... 8504889

[51] Int. Cl.⁵ .............................................. A01D 34/63
[52] U.S. Cl. .................................... 56/10.2; 56/17.5; 172/23
[58] Field of Search ............. 56/10.1, 10.2, 10.8, 56/11.4, 11.5, 14.7, 16.7, 16.9, 17.5, DIG. 15; 172/2, 3, 23, 26, 6; 180/7.5; 254/323, 328, 294, 312; 74/25

[56] References Cited

U.S. PATENT DOCUMENTS

| | | | |
|---|---|---|---|
| 1,367,127 | 2/1921 | Culbertson | 172/23 |
| 3,627,071 | 12/1971 | Haupt | 56/16.7 |
| 3,744,223 | 7/1973 | Jansen | 56/10.2 |
| 4,256,344 | 3/1981 | Hatcher | 180/7.5 |
| 4,440,091 | 4/1984 | Burgess | 56/10.2 |

Primary Examiner—John Weiss
Attorney, Agent, or Firm—Young & Thompson

[57] ABSTRACT

An automatic guidance system for a lawn mower comprises four tension cables (10 to 13) each anchorged at a point (15) adjacent one of the corners of a quadrilateral area and each wound round a winch drum (16 to 19) on the mower, a motor (60) on the mower is arranged to drive the four winch drums selectively in pairs, one drum winding-in while the other winds out, by means of a common gear ring 63 which is shifted into one of four different driving positions determined by a guide plate 68 in a square opening (70). The plate is shifted automatically from one position to the next when the mower approaches any one of the automatically adjustable cleats (20) on the individual cables. The mower thus follows a rectangular path of diminishing size.

8 Claims, 5 Drawing Sheets

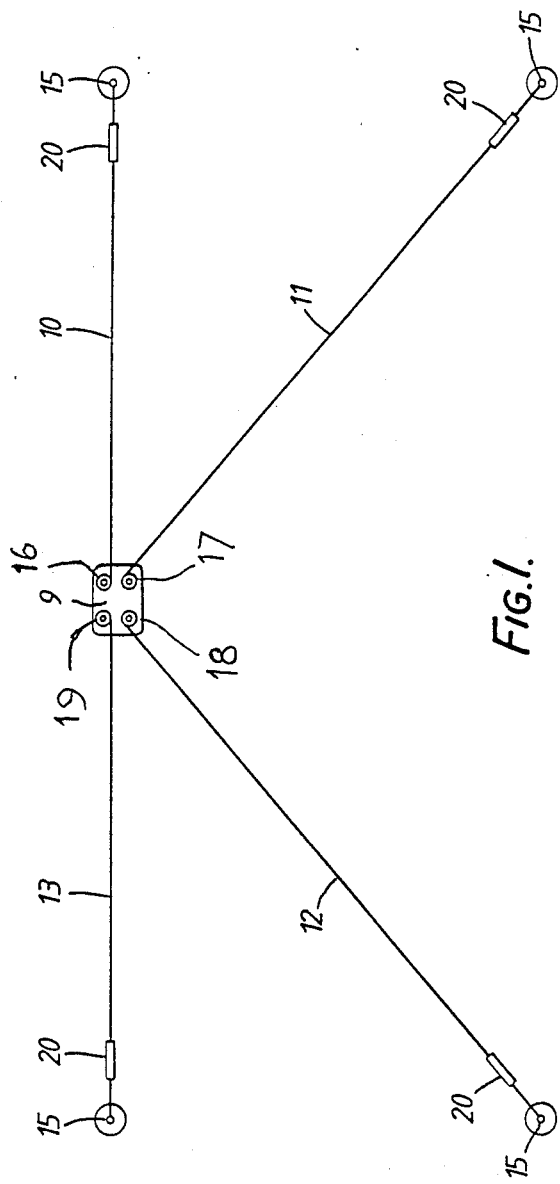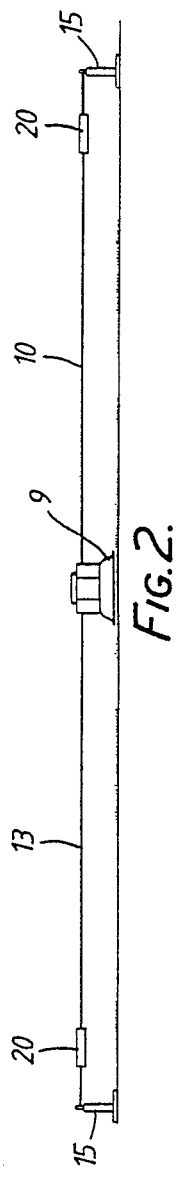

GUIDANCE SYSTEM FOR A SELF-PROPELLED MACHINE

This is a continuation of application Ser. No. 06/832,086, filed Feb. 24, 1986.

Background of the Invention

1. Field of the Invention

This invention relates to an automatic guidance system for a self-propelled machine such as a lawn mower or other horticultural implement.

2. Description of the Prior Art

Several control systems for this purpose have been proposed involving, for example, buried magnetic cables and it is an object of the present invention to provide an improved guidance system which will be simple to manufacture and to install and will be reliable in operation.

Summary of the Invention

Broadly stated the invention consists in a lawn mower or like self-propelled machine or implement, including an automatic guidance system for guiding the machine to move in a two-dimensional path comprising a plurality of cables extending from the machine to anchorage points on the ground spaced apart in two orthogonal directions, and control means on the machine for controlling the cables to cause the machine to move around a multi-sided track defining a progressively changing area. Preferably the machine comprises a plurality of winch drums attached to the individual cables and means for selectively driving the drums in sequence. In addition, the machine preferably includes tensioning means urging at least some of the drums in a direction to apply tension to the respective cables. These tensioning devices will normally be overriden when positive driving connection to a drum is established.

According to a particular preferred feature of the invention the system includes adjustable limiting means determining the extent of movement of the machine along each cable towards its anchorage. Each limit stop may be in the form of an adjustable cleat which is adjustably set in position on each cable so as to be engaged by a control element carried by the machine. Preferably the cleat is moved automatically through a predetermined distance away from its anchorage after each contact with the machine.

From another aspect the invention comprises a machine and guidance system of the type specified in which the machine is arranged to apply traction to one cable and to release an adjacent cable at substantially the same rate. Light tension may be applied simultaneously on a further cable or cables.

Brief Description of the Drawings

The invention may be performed in various ways and one specific embodiment will now be described, by way of example, with reference to the accompanying drawings, in which:

FIG. 1 is a general plan view of a guidance system according to the invention combined with a self-propelled lawn mower, FIG. 2 is a side elevation.

Figure 3:
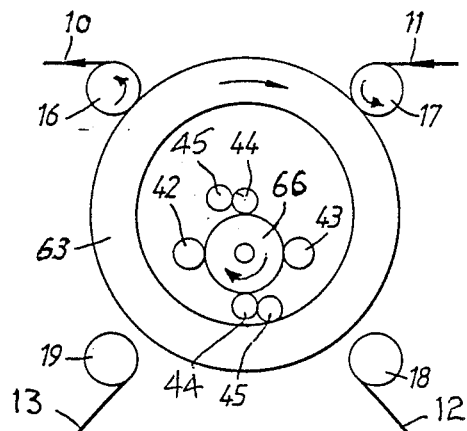
FIGS. 3, 4, 5 and 6, illustrate different positions of the automatic winch driving mechanism.
Figure 4:
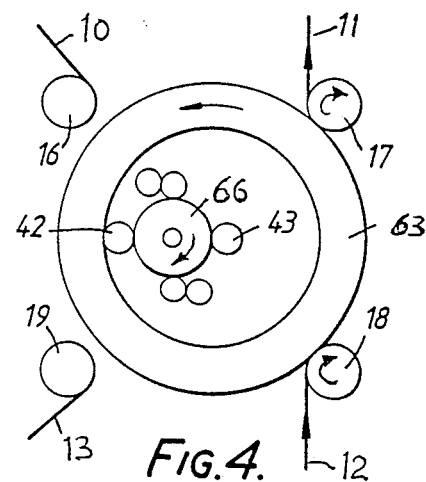
Figure 5:
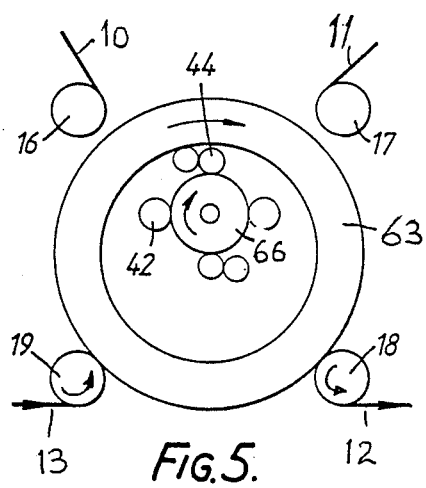
Figure 6:
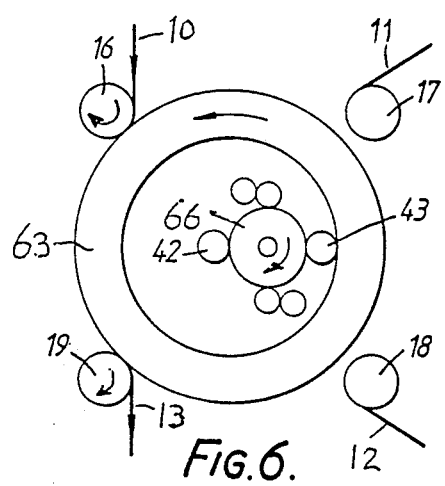

Detailed Description of Preferred Embodiment According to the Invention

The basic system illustrated in FIGS. 1 and 2 comprises four cables 10,11,12,13 each anchored at its outer end to an anchorage post 15, the inner ends of the cables being attached respectively to four winding drums 16,17,18,19 mounted on the base 9 of the mower. Each cable also carries an adjustable cleat 20 acting as a limit stop as will be described. The mower itself is preferably of the hovering type, including an air lift fan, since this system allows the mower to move freely in any direction. The mower may be driven by an internal combustion engine or by an electric motor, but in the later case special provision may be required to avoid the motor cutting its own cable. In this embodiment as shown in FIG. 7 the electric motor 60 is supplied by a power cable 125 wound on a spool 126, which is subject to a continuous light winding torque.

The principle of operation is that the mower is started initially adjacent to one of the posts 15 with the respective cable fully wound on its drum and the other cables initially held taut by tensioning devices combined with the individual winches. A driving mechanism is engaged which winds in one of the cables (e.g. 10 in FIG. 1) and simultaneously releases the opposite cable 13 at the same rate. The remaining two cables 11,12 are merely held lightly taut by the tensioners. As a result the mower progresses towards the anchorage 15 at the far end of the cable 10 making a slight curve towards the centre of the quadrilateral resulting from the tension in the cables 11 and 12. When the mower reaches the cleat 20 on cable 10 there is an automatic transfer of drive from the two winches 19,16 to the next pair 16,17. The cable 11 is winched in and the cable 10 is released thus guiding the mower towards the anchorage post at the end of the cable 11. The mower thus proceeds around the rectangular area from pillar to post in a shape approximately conforming to the quadrilateral designed by the four posts.

The limit of movement on each "leg" is determined by the position of the cleat 20 at the far end and each cleat is constructed to move automatically along the cable by a preselected distance or step on each engagement by the mower. Thus the resultant path followed by the mower progressively shrinks in size until it reaches the centre of the area.

Figure 7:
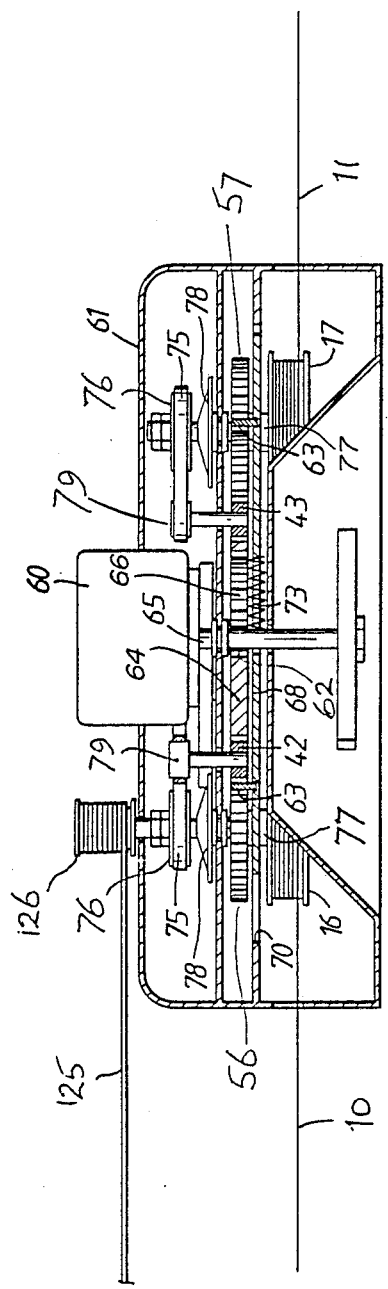
FIG. 7 is a sectional side elevation through the machine illustrating the components of the drive.
Figure 8:
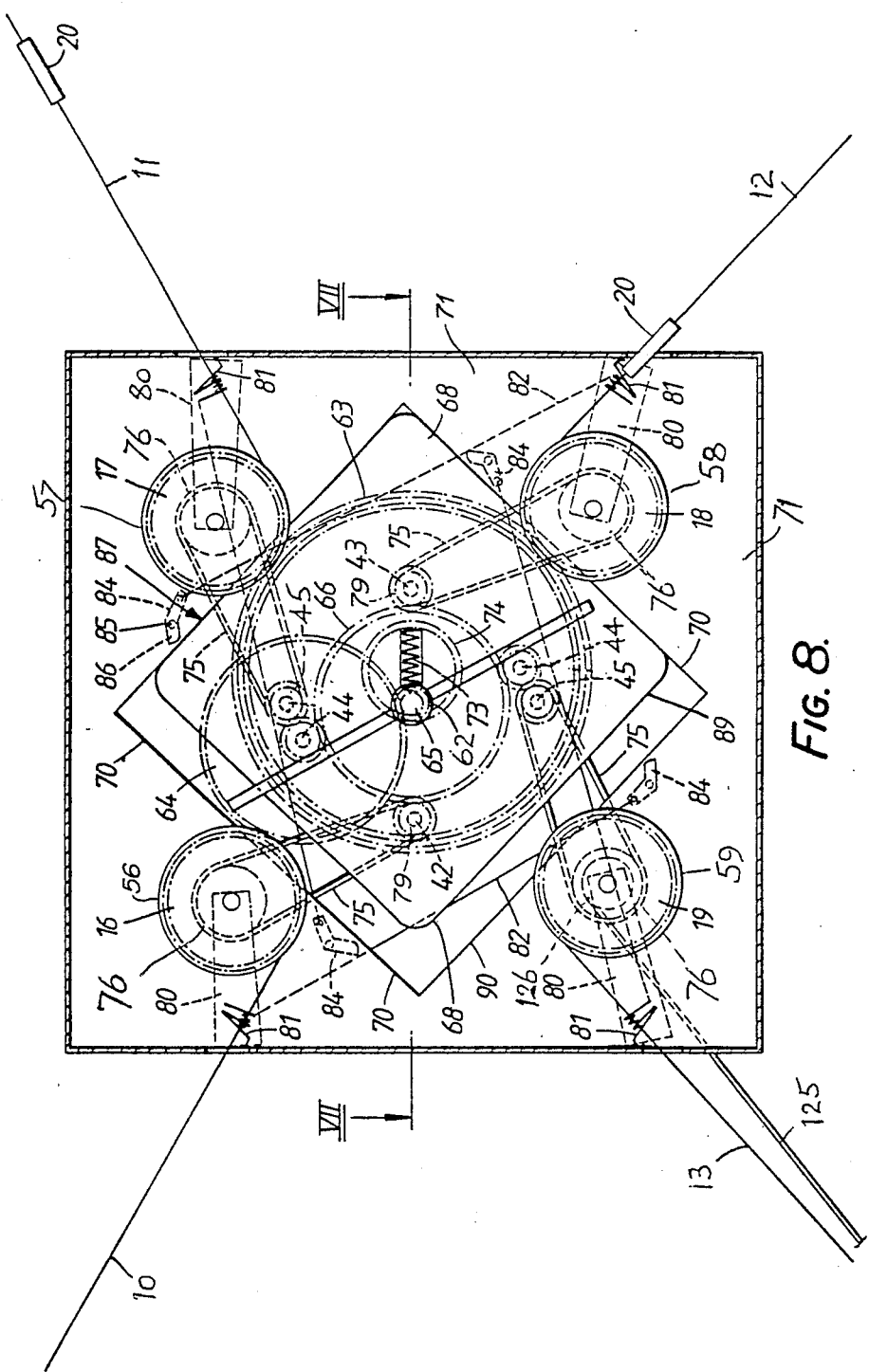
FIG. 8 is a sectional plan view of the machine with the cover removed illustrating the drive mechanism.

The drive mechanism for the cable winches on the mower body is illustrated in more detail in FIGS. 7 and 8. An electric motor 60 carried by a rigid casing 61 has a drive spindle 65 connected to a small pinion 62 driving a larger pinion 64, which together act as a reduction gear pair. The output pinion 64 is coupled to a smaller coaxial pinion (not visible in the cross-section of FIG. 7 and concentric with pinion 44 by which it is concealed in FIG. 8".). arranged to drive a slow moving annulus gear 66, which is thus continuously driven by the motor. The annulus gear 66 meshes constantly with a pair of oppositely positioned intermediate drive pinions 42,43 and with two sets of reversing gear pairs 44,45. Surrounding these gears 42,43,44,45 is a floating annulus gear 63 toothed on its internal and external surfaces. This annulus gear 63 can be shifted into anyone of its four primary positions, as illustrated in FIGS. 3 to 6, and will then engage positively with respective pinions 56,57,58,59 fixed to the winches 16,17,18,19 thus providing a positive drive to the selected winches. The direction of drive of the annulus gear 63 is reversed automatically when it contacts either set of reversing gear pairs 44,45. The position of the annulus gear is determined by a square internal guide plate 68 formed with a guide groove or track or bearings to locate the annulus gear 63. This guide plate is movable within a square aperture or rib 70 formed in a plate 71 attached to a stationary part of the machine. A compression spring 73 acts between the motor spindle 65 whose axis is fixed in position, and a collar 74 attached to the guide plate 68. Whenever the plate 68 is moved away from one of the corners of the square 70, the spring is compressed. This spring therefore tends to urge the collar and hence the square plate continuously away from the spindle axis 65 towards into anyone of the four corners of the square opening 70 thus urging the annulus gear 63 into engagement with one or other of the possible pairs of winch drums. When in any such position the drive to that respective pair of winch drums will be maintained until disturbed (as described below).

To maintain light tension in all the cables at all times- (except when positively driven as described above) slipping friction clutches 78 are provided, one to each winch drum 16,17,18,19. Each drum is driven by a flexible belt 75, which passes around a pulley 76 on the winch spindle 77 and also around a pulley 79 connected respectively to one of the intermediate drive pinions 42,43, or one of the reversing pinions 45. Thus the belts 75 are continuously driven by one or other of the intermediate pinions 42,43 or by the outer one 45 of the reversing pinion pairs 44,45. The connection between each belt pulley 76 and the respective winch-spindle 77 includes a small spring loaded slipping friction clutch 78. Each clutch has input and output elements which are loaded by the respective spring and thus permit relative slip while also providing a continuous tight torsional drive. It will be seen from FIG. 3 that although the pinions 45 rotate in the opposite direction from the intermediate pinions 42,43, this is compensated by the fact that two cables 10,12 are wound onto the drums 16,18 in the opposite direction from cables 11,13 onto drums 17,19. In this way the mechanism provides the capacity for all four winch drums to be subject to a continuous slipping frictional drive in a connection tending to winch-in the respective cable 10,11,12 etc. This slipping frictional drive is overridden automatically when the toothed annulus gear 63 engages any one of the winches as seen in FIGS. 3-6.

When any one winch drum has wound-in the maximum amount of cable and the respective cleat 20 is approaching contact with the mower, the mechanism automatically transfers and reverses the drive so that the mower changes direction and moves along the next side of its quadrilateral course. For this purpose, as illustrated in FIG. 8, each winch drum 16,17,18 etc is associated with a pivoted arm 80 carrying a spring catch or hook 81 at its outer end which is connected by a rod 82 having pivots at opposite ends and attached to a small bellcrank lever 84 whose central pivot point 85 is mounted on a bracket attached to the frame of the machine, the free arm 86 of this bellcrank lever being arranged to engage the adjacent edge 87 of the square guide plate 68. Thus with the parts in the position shown when the drum 18 has wound-in the cable 12 to the point when the respective cleat 20 engages the hook 81 (see bottom right corner of FIG. 8), the lever 84 rear top right corner is automatically operated (upwards in FIG. 8) to shift the plate 68 downwards and to the left so that the opposite flank 89 engages the adjacent wall 90 of the aperture 70. In this position the direction of drive of the annulus gear 63 is automatically reversed and drive is transferred from the winches.

Figure 9:
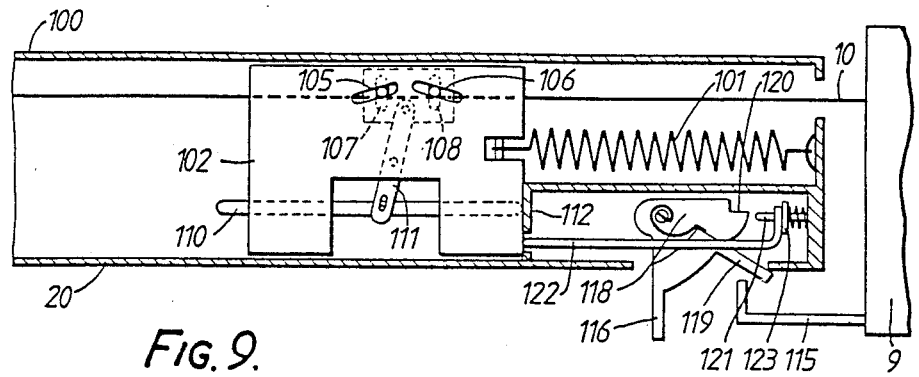
FIG. 9 is a diagrammatic side elevation on an enlarged scale illustrating part of one of the movable cleats.
Figure 10:
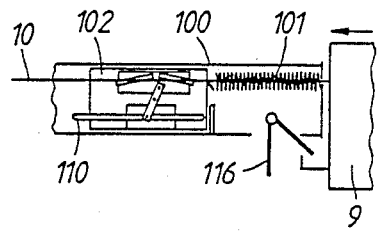
FIGS. 10, 11 and 12 are diagrammatic side elevations illustrating the different stages of operation of a cleat as it moves automatically along its cable.

The normal position of the parts is as illustrated in FIG. 9 in which the spring 101 has pulled the clamp 102 towards the right-hand end of the cleat tube 100. In this position a fixed stop 112 has pushed the control rod 110 to the left thereby engaging the right-hand cable clamp roller 108, which acts to prevent movement of the clamp leftwards along the cable.

Figure 11:
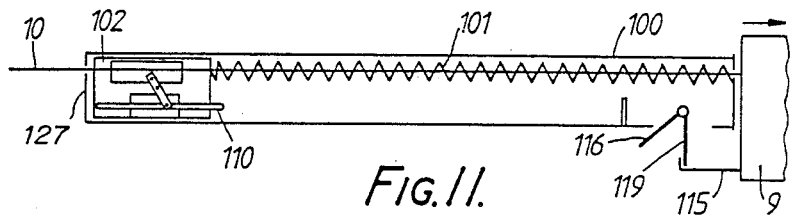

As a result of the winding-in action of the respective winch drum the mower will in due course approach the cleat along the cable until the respective spring catch 81 approaches the end of the cleat. A hook 115 attached to the mower base 9 then makes contact with an arm 116 of a pivoted latch 118 attached to the cleat. The arm 116 thus pivots slightly to the left and its attached arm 119 pivots downwards so that when the direction of travel of the mower is reversed the hook 115 engages this arm 119 and pulls the body or tube of the cleat with the mower to the right. Since the clamp 102 is locked on the cable this rightward movement extends the spring 101 to the position illustrated in FIG. 11 and after the cleat has in this way travelled through one complete step determined by the length of the tube 100, the clamp is released by the engagement of the opposite end wall 127 with the projecting pin end 110 and the spring 101 rapidly pulls the clamp to the opposite end of the cleat tube. The hook 115 on the mower disengages automatically from the latch 119 and the clamp is reset for the next sequence of operations.

Figure 12:
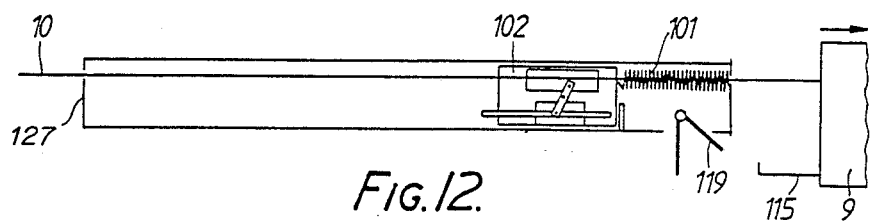

The pivoted latch 118 has a notch 120 which is automatically engaged by a latching pin 121 when the latch pivots in a clockwise direction. The pin prevents the latch turning in the reverse direction and thus locks the arms 116 and 119. When the clamp 102 is pulled by the spring 101 to the right-hand end of the cleat tube 100, it engages the left-hand end of an unlatching bolt 122 which engages a bracket 123 attached to the latch pin 121 thus disengaging the pin and allowing the latch 118 to pivot in an anti-clockwise direction from the position shown in FIG. 11 to that of FIG. 12. In the embodiments described the mower follows a path around the quadrilateral which progressively diminishes in size, but the invention can also be applied to a system in which the mower starts at the centre and works progressively outwards.

I claim:

1. A self-propelled machine, including an automatic guidance system comprising a plurality of cables extending from the machine to anchorage points on the ground spaced apart in two orthogonal directions, and control means on the machine for controlling the cables to cause the machine to move around a multi-sided track defining a progressively changing area.

2. A machine according to claim 1, in which the control means comprises a plurality of winch drums attached to the individual cables and means for selectively driving the drums in sequence.

3. A machine according to claim 1, in which the control means comprises a plurality of winch drums attached to the individual cables and means for selectively driving the drums in sequence, and including automatic tensioning means urging at least some of the drums in a direction to apply tension to the respective cables.

4. A machine according to claim 3, in which the tensioning means includes a slipping clutch in the drive to the respective winch.

5. A machine according to claim 1, including adjustable limiting means mounted on said cables and determining the extent of movement of the machine along each cable towards its anchorage.

6. A machine according to claim 5, including an adjustable cleat which is adjustably set in position on each cable so as to be engaged by a control element carried by the machine.

7. A machine according to claim 6, in which said cleat is moved automatically through a predetermined distance away from its anchorage after each contact with the machine.

8. A machine according to claim 1, in which the control means is arranged to apply traction to one cable and to release an adjacent cable at substantially the same rate while tension is applied on a further non-electrical cable or cables.

* * * * *